July 7, 1959  F. S. REID  2,893,161
SUCTION-BLOWER TYPE ILLUMINATED INSECT TRAP
Filed April 10, 1958  2 Sheets-Sheet 1

INVENTOR
FRANK S. REID
BY
ATTORNEYS

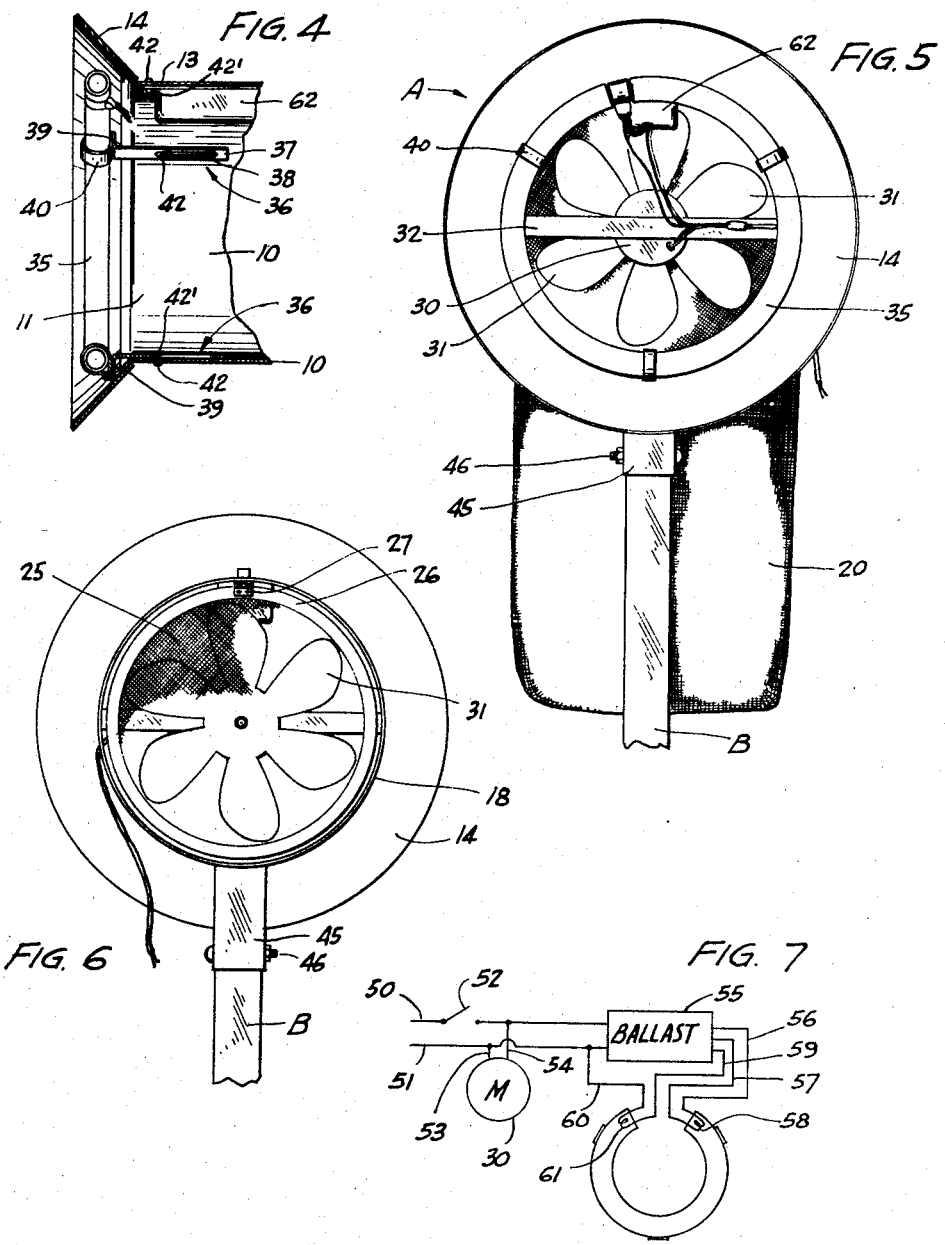

ns Patent Office 2,893,161
Patented July 7, 1959

2,893,161
SUCTION-BLOWER TYPE ILLUMINATED INSECT TRAP

Frank S. Reid, Wilson, N.C.

Application April 10, 1958, Serial No. 727,713

6 Claims. (Cl. 43—139)

This invention relates to machine-type insect traps or catchers.

An important object of the invention is to provide an insect trap including vacuum and blower means to draw insects into the body of a trap and force them therethrough into a removable trap receptacle, with a foraminous trap door interposed between the body and receptacle, which trap door is so disposed that insects and foreign matter collected thereon will not impede proper opening of the same during operation of the trap, whereby the vacuum and blower means will not be over-taxed and damaged by its efforts to open the trap door.

Another important object is to provide an insect trap as described which is so constructed that the trap door is readily accessible for removal of insects and foreign matter blown thereagainst.

A further object is to so dispose moving and electrical parts of the trap so that they will not be apt to be damaged, such as during storage of the trap as well as during operation thereof.

Other objects and advantages of the invention will be apparent during the course of the following detailed description of the invention taken in connection with the accompanying drawings, forming portions of this disclosure, and in which drawings:

Figure 4 is a fragmentary vertical longitudinal sectional view of the front portion of the trap, showing a lamp retracted, as for shipping, storage or the like.

Figure 5 is a front elevational view of the trap.

Figure 6 is a rear elevational view of the trap with trapped insect receptacle removed.

Figure 7 is an electrical wiring diagram of the electrical system of the trap.

Figure 1:
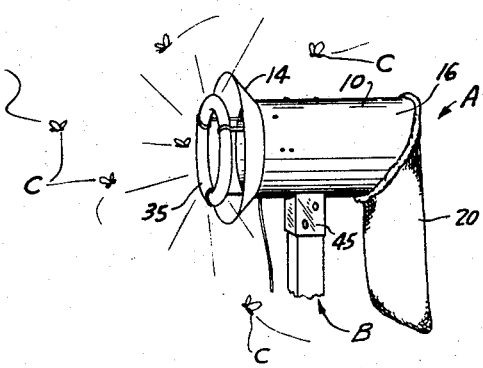
Figure 1 is a perspective view of the trap in operation.

In the drawings wherein for the purpose of illustration is shown a preferred embodiment of the invention and wherein similar reference characters designate corresponding parts throughout the several views, the letter A designates the trap; B, a support therefor; C, insects; D, brush means; and E, the hand of an operator holding the brush means.

The trap A includes a hollow body or housing 10, which is preferably tubular and has a front or entrance opening or port 11 and a rear or discharge port 12. Extending outwardly from the front end portion 13 of the housing 10 is an outwardly flaring flange 14 which has triple purposes, including a funnel-like structure to funnel the insects entering the trap, to form a protection for the retracted lamp, and to limit retraction of the same, as will be more fully detailed. The rear end portion 15 of the housing is provided with an outwardly projecting arcuate portion or hood 16, substantially as shown in Figures 1 and 2, with the outer edge portion 17 of the hood having a peripheral flange 18, best shown in Figures 3 and 6.

Figure 2:
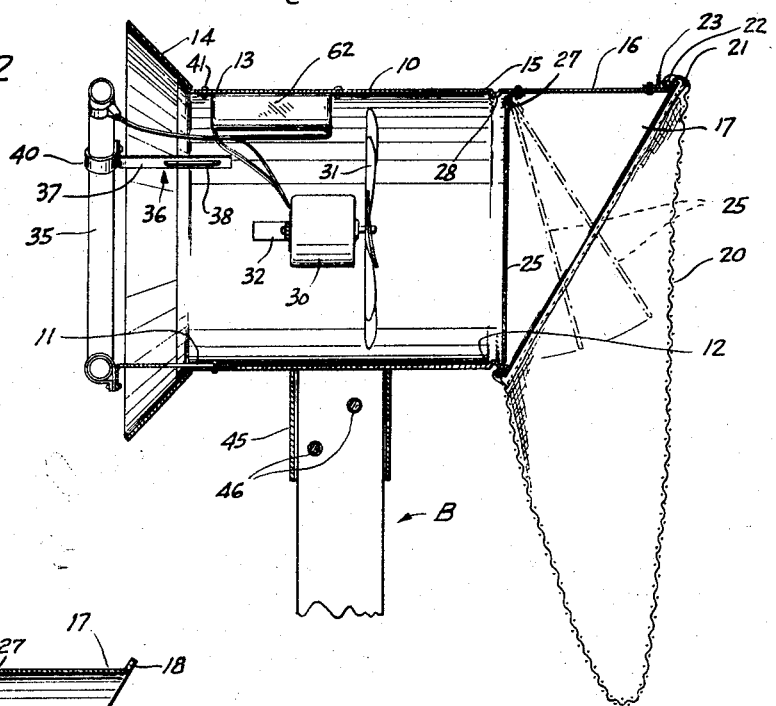
Figure 2 is a vertical longitudinal sectional view thereof with the mechanism of the trap at rest.

Trapped insect receptacle means may comprise a suitable receptacle 20, such as a flexible foraminous one of fiberglass netting and of a bag-shape with a hem 21 at its mouth and which hem encloses a resilient means, as a retractile coil spring 22, which hem and coil spring may be disposed about the outer edge portion 17 of the hood and removably held in place by the flange 18, and an upstanding lug 23 spaced from the flange, as may be seen in Figure 2.

Trap door means comprises a substantially circular oscillatory foraminous trap door 25, such as a sheet of wire or fiberglass screening, provided with a frame 26 and hingedly supported at its uppermost portion as by a hinge 27, with one leaf thereof secured, as by nut and bolt means, to the hood 16 and the other leaf of the hinge secured, as by nut and bolt means, to the frame 26. Stop means to limit swinging of the trap door 25 toward the front end portion 13 of the housing 10 may comprise an inwardly-extending bear 28 which frame 26 is adapted to contact the bead 28 when the trap door is vertical.

Figure 3:
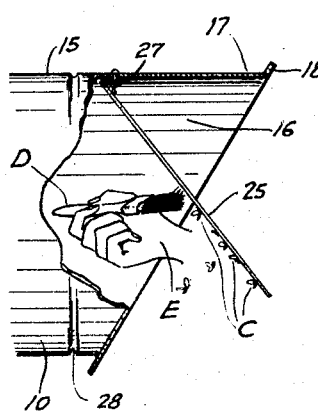
Figure 3 is a fragmentary vertical longitudinal sectional view of the rear portion of the trap showing method of brushing insects and foreign matter from the trap door of the trap.

Outward swing of the trap door is limited by the frame 26 contacting the inner face of the hood 16. This limit is the position of the trap door 25 as shown by dots and dashes at the right in Figure 2, while an intermediate position is shown by the next adjacent dots and dashes, and the vertical position, as in full lines. The size of the receptacle 20, plus the relative size of the periphery of the hood 16 and the overhang of the hood, is such that the outer edges of the frame 26 never contact the material of the receptacle 20, even when the trap door is at its extreme open position contacting the side walls of the hood. For example, with a trap door, including its frame, 10½ inches in diameter and the hood being 11 inches in diameter, the secant of the circumference of the hood, at the points of contact by the trap door, is substantially 10 inches. The hood is preferably 6 inches wide at its greatest overhang (extreme upper portion). These dimensions are given by way of example since they may be greater or less in proportion, one to another. This non-contact of trap door 25 and receptacle 20 prevents wear upon the material of the receptacle. The outermost swing of the trap door, as in Figure 3, is such that there is room between it and the hood to insert a brush D, or the like, and the hand E of an operator, in order to remove insects and foreign matter as leaves, twigs, and the like, adhering to the trap door.

The suction and air pressure means may be an electric motor 30, rotatably supporting a fan 31 disposed in the housing 10, intermediate its end portions 13 and 15, and supported by a cross member or strap 32, bridging the housing, horizontally disposed, and secured at its end portions to the housing in any approved way, such as by welding. The motor housing may be bolted to the strap at the central portion of the latter, with the fan facing the end portion 15 to blow air toward that end.

Illuminating means is preferably a conventional so-called black light, with ring-shaped envelope 35, circular in transverse section, and carried by support means, which are a plurality, as three, extensible brackets 36, shown in Figures 2, 4 and 5. Each bracket comprises an elongated arm portion 37 provided with an elongated slot 38, a short abutment portion 39 normal to and extending from the end of the arm portion 37, and an eye portion 40, next adjacent the portion 39, to extend about the envelope 35. Into each slot 38 extends a suitable lug, as a portion of the shank of a bolt 41, with the shank also extending through an opening in the end portion 13 of the housing 10. The head 42 of the bolt contacts the outer periphery of the housing, while a nut 42' upon the shank may be tightened or loosened in order to permit fixing of the positions of the lamp means with respect to the flange 14. That is, with the nuts loosened, the brackets may be slid forward until the lamp means envelope 35 is positioned substantially as in Figures 1 and 2 (the operative position) and the nuts then tightened, or the nuts may be loosened and the brackets slid rearwardly until the bracket abutment portion 39 abuts the inner face of the flange 14, whereby the envelope will not contact the flange and, perhaps, be broken. When the brackets are so positioned, the lamp envelope is disposed substantially as in Figure 4 and protected by the flange against breakage, as when the trap is stored, shipped or on the dealers' shelves for sale.

Means for mounting the housing 10 upon a support, as the upwardly-extending post B, may be a downwardly-opening socket structure 45, secured to the underside of the housing 10, intermediate its ends, to receive the upper end portion of the post B. Bolt and nut means 46 may be used to fixedly secure the housing to the post.

Associated with the motor and lamp means may be an electrical system comprising conductors 50 and 51, with switch 52 interposed in one conductor, and leads 53 and 54 extending from the conductors to the motor 30. The conductors extend to a conventional ballast means 55 from which leads 56 and 57 extend to one electrode 58 of the lamp means and another lead 59 extending from the ballast means, together with a lead 60 extending from the conductor 51, extend to the other electrode 61 of the lamp means. The housing 62 for the ballast means is preferably secured to the housing 10 at the upper portion of the latter, substantially as in Figs. 2 and 5, with the leads to the lamp means emerging from the housing 62 at closely adjacent its rearward end wall, so that they will be somewhat taut when the brackets 36 are extended, as in Figure 2.

After the trap A is mounted as described, with the envelope 35 extended substantially as in Figures 1 and 2, and the conventional electrical connections made with a suitable power line and the circuit closed, the lamp means will be placed in operation and the fan 31 commences to rotate. Insects attracted by the lighted lamp means will fly toward the same, will hover thereabout and be drawn or sucked through the entrance port 11, being funnelled thereinto by the flange 14 and then blown by the fan against the open trap door (open to substantially the intermediate position thereof as in Figure 2). Most will then fall or fly along the trap door and into the receptacle 20 being unable to return because of the blast of air. As foreign matter and other insects may collect upon the trap door, they will impede the flow of air through the foraminous portion thereof and this will cause a gradually increasing open position of the same, so that a larger volume of the air blast will flow between the trap door and the mouth of the receptacle and the motor 30 will not become overloaded by increased back pressuer. This has been discovered by me as a fault of traps in which there is a fixed solid walled or foraminous baffle instead of a trap door, or a trap door which initially is swung to a fully open position.

From Figure 3 it may be seen that foreign matter and insects may be readily brushed from the trap door 25 since it is readily accessible when the receptacle 20 is removed.

At its outwardly extended position, the envelope 35 of the lamp means is so positioned that the radiating light rays therefrom will attract insects C which may not be in front of the lamp means. When retracted (which is the important position when shipping, storing and the like of the trap), as in Figure 4, the envelope 35 is fully protected and the trap may be disposed upon the edge of the flange 14.

Various changes in the size, shape and arrangement of parts may be made to the form of invention herein shown and described, without departing from the spirit of the invention or scope of the claims.

What is claimed is:

1. An insect trap including a tubular housing having an insect entrance end and an oposite end, an arcuate hood extending outwardly from said opposite end and having an upper portion and gradually decreasing in width from said upper portion of said hood, a circular oscillatory trap door closing said opposite end when said trap door is in one position, hinge means for said trap door between the upper portion of said trap door and said hood; and a trapped insect receptacle hanging from said hood, the horizontal distance apart of the inner faces of said side walls being such that when said trap door is in its extreme open position it will contact said inner faces, and said trap door will be free of contact with said receptacle at all times.

2. An insect trap according to claim 1 characterized in that said trap includes blower means disposed within said trap for blowing air upon the inner face of said trap door to force said trap door out of said one position thereof.

3. An insect trap according to claim 1 characterized in that said trap door is in a substantially vertically closed position, and that said trap includes blower means disposed within said trap for blowing air upon the inner face of said trap door to force said trap door out of said vertically closed position.

4. An insect trap according to claim 1 characterized in that said trap door has a foraminous central portion and is in a substantially vertically closed position, and that said trap includes blower means disposed within said trap for blowing air upon the inner face of said trap door to force said trap door out of said vertically closed position.

5. In an insect trap, a housing containing a suction fan and provided with an insect entrance opening and a peripheral flage surrounding said opening; a circular tubular lamp; and bracket means carried by said housing for adjustably supporting said lamp at said opening and for moving said lamp in paths within said flange wherein the central axis of said circular lamp and housing align at all times, including an abutment portion for contacting said flange upon movement of said lamp to a position within said flange, whereby the lamp will be free of contact with said flange.

6. In an insect trap, a housing containing a suction fan and provided with an insect entrance opening and a peripheral flange surrounding said opening; a circular tubular lamp; and bracket means carried by said housing for adjustably supporting said lamp at said opening and for moving said lamp in paths within said flange wherein the central axis of said circular lamp and housing align at all times, comprising a plurality of slotted arms, each having an abutment portion normal thereto and disposed between said lamp and said flange, a lamp supporting portion carried by said abutment portion, and means extending through said slot and secured to said housing inwardly of and adjacent said flange to guide the path of movements of said arm in a straight path and slidably retain said arm to said housing, the length of said abutment portion being such that said abutment portion will contact said flange upon movement of said lamp to within said flange, whereby the lamp will be free of contact with said flange.

References Cited in the file of this patent

UNITED STATES PATENTS

| | | |
|---|---|---|
| 1,671,404 | Cherry | May 29, 1928 |
| 2,780,026 | Dail et al. | Feb. 5, 1957 |